Patented Sept. 19, 1939

2,173,410

UNITED STATES PATENT OFFICE 2,173,410

O-HYDROXYAZO DYESTUFFS AND A PROCESS FOR THEIR MANUFACTURE

Achille Conzetti and Abram Oulevay, Basel, Switzerland, assignors to the firm of J. R. Geigy A. G., Basel, Switzerland No Drawing. Application December 23, 1938, Serial No. 247,534. In Switzerland December 29, 1937

10 Claims. (Cl. 260—196)

This invention relates to the manufacture of valuable o-hydroxyazo-dyestuffs by coupling a diazotized aromatic amine containing a hydroxyl group in o-position to the diazonium group or a derivative of such diazotized aromatic amine with 2-aminonaphthalene-5-sulphonic-3-carboxylic acid, or with a 2-aminonaphthalene-x-sulphonic-3-carboxylic acid obtainable from the monosulphonation mixture of 2:3-hydroxy-naphthoic acid after separation of the difficulty soluble calcium salt of the 2-hydroxynaphthalene-8-sulphonic-3-carboxylic acid and amination of the residue by known methods or a derivative thereof. As derivatives of the o-hydroxydiazonium compound there come into consideration especially nitro, halogen or alkyl substitution products. All these o-hydroxy-substituted amines may also contain groups imparting solubility in water, for instance sulphonic acid groups or carboxylic acid groups.

The new dyestuffs have a very good levelling capacity and yield by the after-chroming process green dyeings on wool which are characterized by purity of tint, very good fastness to fulling and potting and especially good fastness to light. The 2-aminonaphthalene-5-sulphonic-3-carboxylic acid used as coupling component may easily be obtained from the 2-hydroxynaphthalene-5-sulphonic-3-carboxylic acid described in British specification No. 30,505 of 1938 by the known aminating methods (see U. S. Patent 1,690,785). A similar aminonaphthalene-sulphonic-carboxylic acid, probably a mixture of the 5- and 6-sulphonic acids is obtained from the monosulphonation mixture of 2:3-hydroxynaphthoic acid after separation of the difficulty soluble calcium salt of the 2-hydroxynaphthalene-8-sulphonic-3-carboxylic acid and amination of the residue by known methods.

The following examples illustrate the invention.

Example 1

A diazo compound made by the usual method from 15.4 kilos of 5-nitro-2-aminophenol is buffered with sodium acetate to be neutral to Congo and introduced into a solution distinctly acid with acetic acid which has been made by dissolving 27.5 kilos of 2-aminonaphthalene-5-sulphonic-3-carboxylic acid in 15 kilos of an ammonia solution of 25 per cent strength in 400 litres of water with addition of 15 kilos of crystallized sodium acetate and subsequently made acid with acetic acid. The coupling temperature is kept at about 20° C. until formation of dyestuff is complete; the whole is then filtered, the sodium salt is obtained by the usual method, salted out and filtered.

The dyestuff is a dark powder, soluble in water to a bluish red solution and in concentrated sulphuric acid to a blue-violet solution. It dyes wool in an acid bath by the after-chroming method pure, grass-green shades. The dyeing is very fast to fulling and potting, very level and of remarkable fastness to light.

With diazotized 2-nitro-5-amino-4-hydroxy-1-methylbenzene a quite similar dyestuff is obtained which dissolves in water with bluish-red and in concentrated sulphuric acid with blue-violet colour. Diazotized picramic acid yields a dyestuff soluble in water and concentrated sulphuric acid with red colour whose chromed dyeings are yellowish-olive.

Instead of the above named aminophenols other o-aminophenols may be used, for example: 4-chloro-2-aminophenol, 4:6-dichloro-2-aminophenol, 4:6-dinitro-2-aminophenol, 4-chloro-6-nitro-2-aminophenol, 6-chloro-4-nitro-2-aminophenol, 3-nitro-5-amino-4-hydroxy-1-methylbenzene, the known trichloro-o-aminophenols or the like.

Example 2

22.35 kilos of 4-chloro-6-aminophenol-2-sulphonic acid are diazotized in the usual manner, the diazo compound is buffered with crystallized sodium acetate to be neutral to Congo and introduced into a solution acid with acetic acid of 27.5 kilos of 2-aminonaphthalene-5-sulphonic-3-carboxylic acid which has been made as described in Example 1. Coupling is allowed to proceed at about 20° C. and is completed after 2–3 days. After filtration, the dyestuff is converted into the sodium salt, salted out and filtered.

The dyestuff dyes wool by the after-chroming method very pure, yellowish-green tints which have a very good fastness to fulling and are remarkably level. The fastness to light is very good.

As diazo components other diazotized o-aminophenolsulphonic acids may be used, for instance: 2-nitro-6-aminophenol-4-sulphonic acid, 4-nitro-6-aminophenol-2-sulphonic acid, 3-chloro-6-aminophenol-4-sulphonic acid; also aminophenolcarboxylic acids may be used, for example: 5-chloro-3-amino-2-hydroxybenzoic acid, 5-nitro-3-amino-4-hydroxybenzoic acid and the like.

Example 3

18.85 kilos of 4-chloro-5-nitro-2-aminophenol are diazotized in the usual manner, and the diazo-compound is buffered with sodium acetate to be neutral to Congo. Meanwhile 31 kilos of 2-aminonaphthalene-5-sulphonic-3-carboxylic acid ethyl ester, made from the carboxylic acid by esterification by means of gaseous hydrochloric acid in ethylalcohol, are dissolved in 400 litres of water with the aid of the necessary quantity of sodium carbonate, 15 kilos of crystallized sodium acetate are added and the solution is made weakly acid with acetic acid. When diazotization is complete the diazo compound is allowed to run into the solution at 20° C. of the coupling component and the whole is stirred for 2-3 days. When the formation of dyestuff is complete, the dyestuff is worked up in the usual manner.

It dyes wool by the after-chroming method a pure green tint. The dyeings have the same good properties as have the dyestuffs described in Examples 1 and 2.

Instead of the ethyl ester of 2-aminonaphthalene-5-sulphonic-3-carboxylic acid used in this example, other esters such as the methyl- or butylester or the amides obtainable therefrom by reaction of ammonia or an amine, for example 2-aminonaphthalene-5-sulphonic-3-carboxylic acid amide or -dimethylamide, may be used.

If instead of the 2-aminonaphthalene-5-sulphonic-3-carboxylic acid or the derivatives thereof used in the above examples, the 2-aminonaphthalene-$x$-sulphonic-3-carboxylic acid, obtained from the monosulphonation mixture of 2:3-hydroxynaphthoic acid after separation of the difficultly soluble 2-hydroxy-naphthalene-8-sulphonic-3-carboxylic acid calcium salt and amination of the residue by known methods of a derivative thereof, is employed, dyestuffs with quite similar properties are obtained.

What we claim is:

1. A process for the manufacture of o-hydroxyazo-dyestuffs, comprising coupling a diazotized o-aminophenol with a member of the group consisting of 2-aminonaphthalene-5-sulphonic-3-carboxylic acid, the alkyl esters and amides of said acid, 2-aminonaphthalene-$x$-sulphonic-3-carboxylic acid, obtained from the monosulphonation mixture of 2:3-hydroxynaphthoic acid after separation of the difficultly soluble calcium salt of 2-hydroxynaphthalene-8-sulphonic-3-carboxylic acid and amination, the esters and amides of said acid.

2. A process for the manufacture of o-hydroxyazo-dyestuffs, comprising coupling a diazotized nitro-o-aminophenol with a member of the group consisting of 2-aminonaphthalene-5-sulphonic-3-carboxylic acid, the alkyl esters and amides of said acid, 2-aminonaphthalene-$x$-sulphonic-3-carboxylic acid, obtained from the monosulphonation mixture of 2:3-hydroxynaphthoic acid after separation of the difficultly soluble calcium salt of 2-hydroxynaphthalene-8-sulphonic-3-carboxylic acid and amination, the esters and amides of said acid.

3. A process for the manufacture of an o-hydroxyazo-dyestuff, comprising coupling in weakly acid medium diazotized 5-nitro-2-aminophenol with 2-aminonaphthalene-$x$-sulphonic-3-carboxylic acid obtainable from the monosulphonation mixture of 2:3-hydroxynaphthoic acid after separation of the difficultly soluble calcium salt of the 2-hydroxynaphthalene-8-sulphonic-3-carboxylic acid and amination.

4. A process for the manufacture of an o-hydroxyazo-dyestuff, comprising coupling in weakly acid medium diazotized 2-nitro-5-amino-4-hydroxy-1-methylbenzene with 2-aminonaphthalene-5-sulphonic-3-carboxylic acid.

5. A process for the manufacture of an o-hydroxyazo-dyestuff, comprising coupling in weakly acid medium diazotized picramic acid with 2-aminonaphthalene-$x$-sulphonic-3-carboxylic acid obtainable from the monosulphonation mixture of 2:3-hydroxynaphthoic acid after separation of the difficultly soluble calcium salt of the 2-hydroxynaphthalene-8-sulphonic-3-carboxylic acid and amination.

6. As new products the o-hydroxyazo dyestuffs corresponding in the free state to the following general formula:

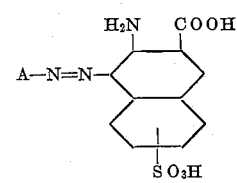

wherein A means the radical of a diazotized o-aminophenol, being dark powders, soluble in water and dyeing wool in an acid bath by the after-chroming method green shades of good fastness to fulling, potting and light.

7. As new products the o-hydroxyazo-dyestuffs corresponding in the free state to the following general formula:

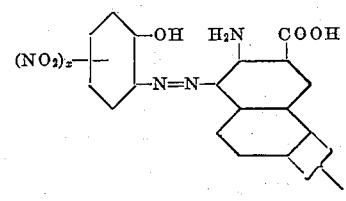

wherein $x$ means an integer not greater than 2, being dark powders, soluble in water and dyeing wool in an acid bath by the after-chroming method green shades of good fastness to fulling, potting and light.

8. As a new product the o-hydroxyazo-dyestuff corresponding in the free state to the following formula

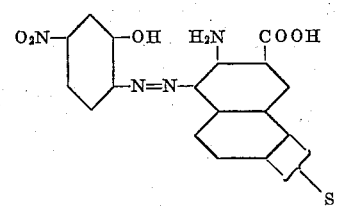

being a dark powder soluble in water to a bluish-red solution, in concentrated sulphuric acid to a blue-violet solution and dyeing wool in an acid bath by the after-chroming method very level, pure, grass-green shades of very good fastness to fulling, potting and light.

9. As a new product the o-hydroxyazo-dyestuff corresponding in the free state to the following formula

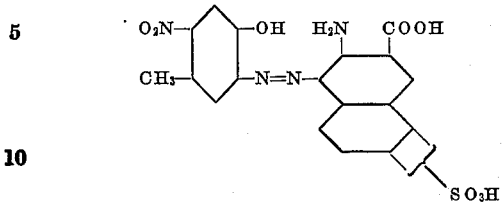

being a dark powder soluble in water to a bluish-red solution, in concentrated sulphuric acid to a blue-violet solution and dyeing wool in an acid bath by the after-chroming method very level, pure, grass-green shades of very good fastness to fulling, potting and light.

10. As a new product the o-hydroxyazo-dyestuff corresponding in the free state to the following formula

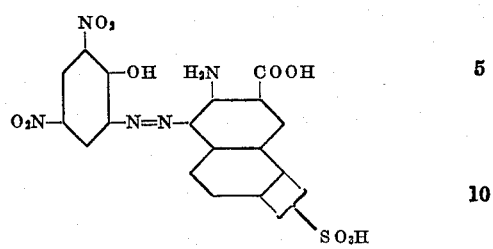

being a dark powder soluble in water and concentrated sulphuric acid to a red solution and dyeing wool in an acid bath by the after-chroming method very level, yellowish-olive shades of very good fastness to fulling, potting and light.

ACHILLE CONZETTI.
ABRAM OULEVAY.